United States Patent [19]
Lee et al.

[11] Patent Number: 5,528,311
[45] Date of Patent: Jun. 18, 1996

[54] COMPLEX FILTER APPARATUS FOR USE IN AN EQUALIZER

[75] Inventors: Chang-Eui Lee; Sang-Uk Lee; Nam-Ik Cho; Yoon-Gi Yang, all of Seoul, Rep. of Korea

[73] Assignee: Daewoo Electronics Co., Ltd., Seoul, Rep. of Korea

[21] Appl. No.: 490,285

[22] Filed: Jun. 14, 1995

[30] Foreign Application Priority Data

Jun. 14, 1994 [KR] Rep. of Korea .................. 94-13294

[51] Int. Cl.$^6$ .................................................. H04N 5/21
[52] U.S. Cl. ................................. 348/607; 348/624
[58] Field of Search .................................. 348/607, 624, 348/914; 358/167, 36; 375/235; 364/724.16; H04N 5/213, 5/21

[56] References Cited

U.S. PATENT DOCUMENTS 5,400,084 3/1995 Scarpa ......................................... 348/624

Primary Examiner—James J. Groody
Assistant Examiner—Sherrie Hsia
Attorney, Agent, or Firm—Anderson Kill Olick & Oshinsky

[57] ABSTRACT

A complex filter apparatus for correcting a complex valued input television signal Y having the real and the imaginary parts $Y_r$ and $Y_i$ to produce a complex filtered output television signal Z having the real and the imaginary parts $Z_r$ and $Z_i$ comprises: three filters having their respective filter coefficients $(C_r+C_i)$, $C_i$ and $C_r$; a first adder for producing an output of $(Y_r+Y_i)$; a first subtractor for producing an output of $(Y_r-Y_i)$; a second subtractor for producing an output $Y_r(C_r+C_i)-(Y_r+Y_i)C_i$ as the real part $Z_r$; and a third subtractor for generating an output $Y_r(C_r+C_i)-(Y_r-Y_i)C_r$ as the imaginary part $Z_i$.

2 Claims, 2 Drawing Sheets

COMPLEX FILTER APPARATUS FOR USE IN AN EQUALIZER

FIELD OF THE INVENTION

The present invention relates to a complex filter for use in an equalization apparatus incorporated in a high definition television (HDTV) signal receiver; and, more particularly, to an improved complex filter with a reduced number of filters.

DESCRIPTION OF THE PRIOR ART

In a HDTV system, television signals from a television signal transmission source are transmitted over a transmission channel such as radio channel to a HDTV signal receiving end.

Conventionally, a television signal includes image, audio and synchronizing information and is converted into a digital television signal to be transmitted. The digital television signal is then modulated by using, e.g., a conventional quadrature amplitude modulation (QAM) or phase shift keying (PSK) technique and provided through the transmission channel to an equalizer at the HDTV signal receiving end. At an upper stream of the equalizer, a received television signal to the HDTV signal receiver is separated into an in-phase and a quadrature components before being supplied to the equalizer. The equalizer normally corrects the received television signal which may have been distorted during the transmission thereof to produce an equalized television signal having equalized in-phase and quadrature component signals. The equalizer comprises a complex filter having a number of FIR (finite impulse response) filters for filtering the received television signal according to their respective filter coefficients.

Assuming now that the input to the complex filter is a complex valued signal Y having a real part Yr and an imaginary part $Y_i$ represented by the in-phase and the quadrature components of the complex input signal and the output from the complex filter is a complex valued signal Z having a real part $Z_r$ and an imaginary part $Z_i$ represented by the in-phase and the quadrature components of the complex output signal, then the output Z from the complex filter can be represented as follows:

$$\begin{aligned} Z &= YC \\ &= (Y_r + jY_i)(C_r + jC_i) \\ &= (Y_rC_r - Y_iC_i) + j(Y_rC_i + Y_iC_r) \\ &= Z_r + jZ_i \end{aligned}$$

wherein $C_r$ and $C_i$ are the real and the imaginary parts of a filter coefficient C of a FIR filters, respectively.

FIG. 2 shows a circuit diagram of a typical complex filter realized pursuant to the above equation. As shown, in order to meet the condition of the equation, the complex filter should have a set of four FIR filters 11, 12, 13 and 14 and a pair of adders 15 and 16 in case there are two inputs and two outputs. Furthermore, each of the FIR filters 11, 12, 13 and 14 is essentially implemented with N number of multipliers and a several number of adders (wherein N represents the number of tabs used therein) wherein the hardware implementation or manufacturing of a multiplier is much difficult than that of an adder. Accordingly, it is desirable to reduce the number of the FIR filters, to thereby alleviate the laborious and costly task to manufacture the multipliers.

SUMMARY OF THE INVENTION

It is, therefore, an object of the invention to provide an improved complex filter apparatus having a simple and efficient structure.

It is another object of the invention to provide an improved complex filter apparatus with a reduced number of filters.

In accordance with the present invention, there is provided a complex filter apparatus for use in an equalizer for correcting an input television signal to produce a filtered output television signal wherein the input television signal includes a complex valued input signal Y having an in-phase and a quadrature input components represented by a real part $Y_r$ and an imaginary part $Y_i$ and the filtered output television signal includes a complex valued output signal Z having an in-phase and a quadrature output components represented by a real part $Z_r$ and an imaginary part $Z_i$, the apparatus comprising: a first adder for adding the real part $Y_r$ and the imaginary part $Y_i$ to produce an output of $(Y_r+Y_i)$; a first subtractor for subtracting the imaginary part $Y_i$ from the real part $Y_r$ to produce an output of $(Y_r-Y_i)$; a first filter having a filter coefficient $(C_r+C_i)$ for multiplying the real part $Y_r$ by the filter coefficient $(C_r+C_i)$ to generate an output of $Y_r(C_r+C_i)$; a second filter having a filter coefficient $(C_i)$ for multiplying the output from the first adder by the filter coefficient $(C_i)$ to generate an output of $(Y_r+Y_i) C_i$; a third filter having a filter coefficient $(C_r)$ for multiplying the output from the first subtractor by the filter coefficient $(C_r)$ to generate an output of $(Y_r-Y_i) C_r$; a second subtractor for subtracting the output of the second filter from the output of the first filter to produce an output $Y_r(C_r+C_i)-(Y_r+Y_i) C_i$ as the real part $Z_r$; and a third subtractor for subtracting the output of the third filter from the output of the first filter to produce an output $Y_r(C_r+C_i)-(Y_r-Y_i) C_r$ as the imaginary part $Z_i$.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
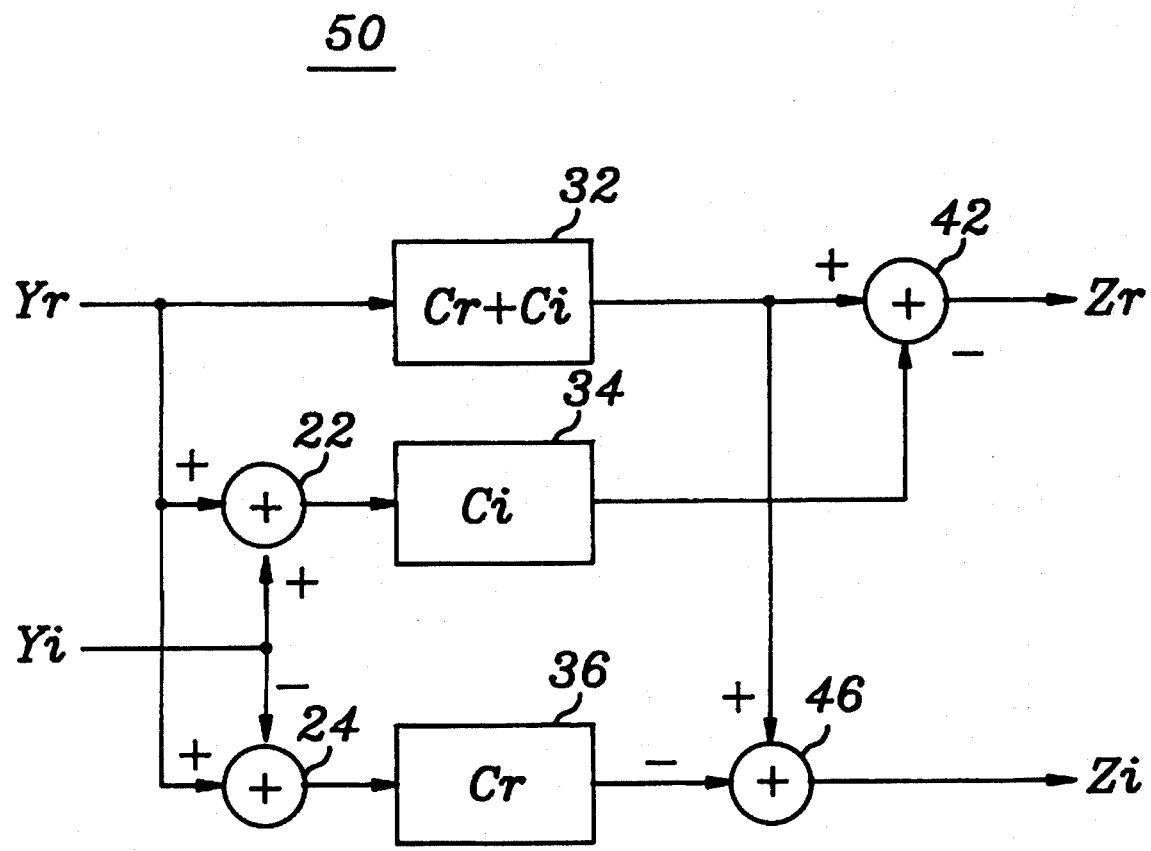
FIG. 1 illustrates a circuit diagram of a complex filter in accordance with the present invention.
Figure 2:
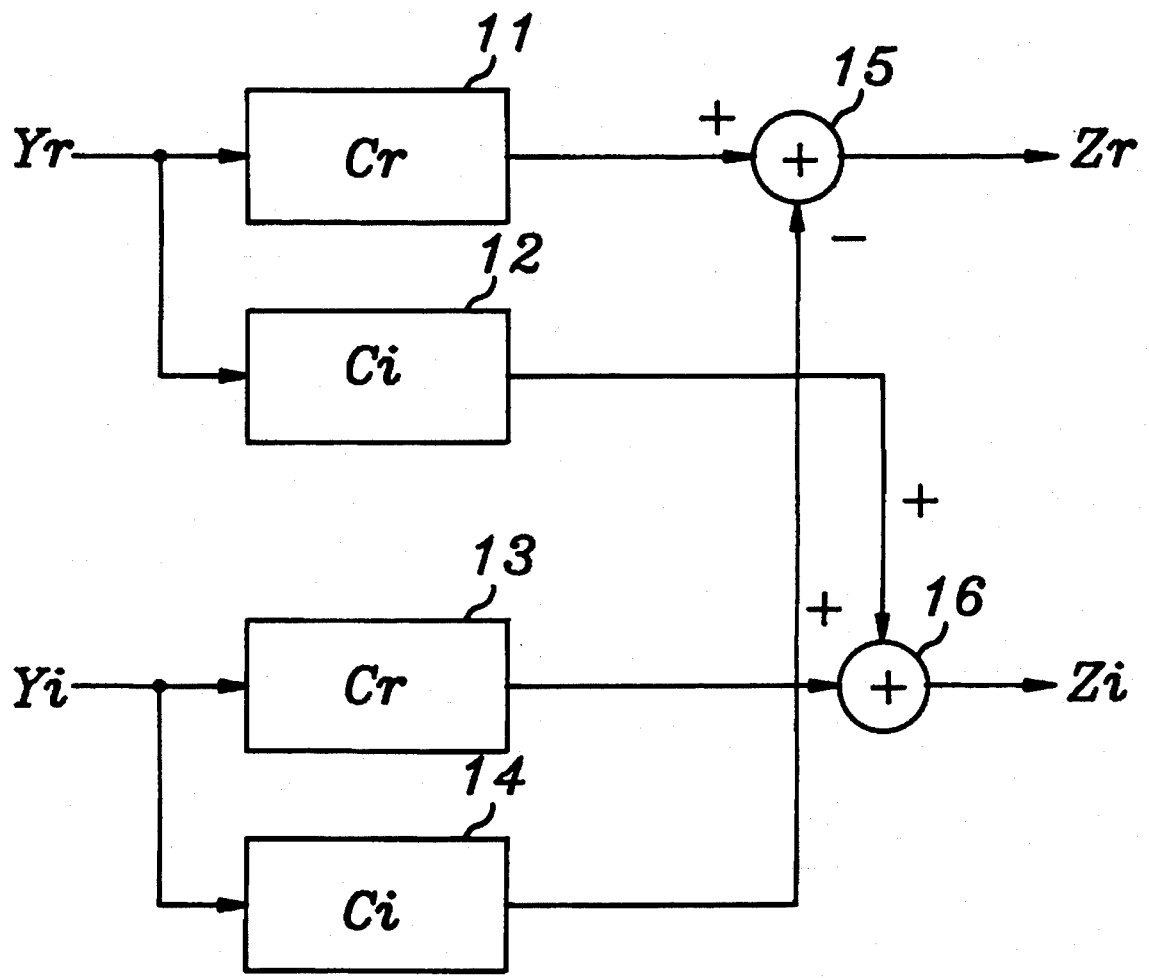
FIG. 2 shows a circuit diagram of a prior art complex filter.

Referring to FIG. 1, there is shown a circuit diagram of a complex filter apparatus 50 for use in an equalizer which corrects an input television signal that may have been subjected to distortion during the transmission thereof to produce a filtered and equalized output television signal which approximates an original television signal. The input television signal comprises a complex valued input signal Y which is separable into an in-phase and a quadrature input components represented by a real part $Y_r$ and an imaginary part $Y_i$. Similarly, the filtered output television signal comprises a complex valued output signal Z having an in-phase and a quadrature output components represented by of a real part $Z_r$ and an imaginary part $Z_i$.

As discussed above, the in-phase and the quadrature outputs $Z_r$ and $Z_i$ from the complex filter apparatus 50 may be represented as follows, respectively:

$$Z_r = (Y_r C_r - Y_i C_i) \quad (1)$$

$$Z_i = (Y_r C_i + Y_i C_r) \quad (2)$$

In accordance with the invention, the above conditions (1) and (2) are replaced with the following:

$$Z_r = Y_r(C_r + C_i) - (Y_r + Y_i)C_i \quad (3)$$

$$Z_i = Y_r(C_r + C_i) + (Y_r - Y_i)C_r \quad (4)$$

In order to implement a complex filter apparatus satisfying the above conditions (3) and (4), the inventive complex filter apparatus 50 comprises a set of first, second and third FIR filters 32, 34 and 36, a first adder 22 and a first subtractor 24. The three filters 32, 34 and 36 are designed to have their respective filter coefficients $(C_r + C_i)$, $C_i$ and $C_r$, respectively.

The first adder 22 serves to add the real part $Y_r$ of the complex input signal to the imaginary part $Y_i$ thereof to produce an output of $(Y_r + Y_i)$ and the first subtractor 24 functions to subtract the imaginary part $Y_i$ of the complex input signal Y from the real part $Y_r$ thereof to produce an output of $(Y_r - Y_i)$.

The first FIR filter 32 performs to multiply the real part $Y_r$ by its filter coefficient $(C_r + C_i)$ to generate an output of $Y_r (C_r + C_i)$. The second FIR filter 34 multiplies the output $(Y_r + Y_i)$ from the first adder 22 by its filter coefficient $(C_i)$ to generate an output of $(Y_r + Y_i) C_i$. The third FIR filter 36 multiplies the output $(Y_r - Y_i)$ from the first subtractor 24 by its filter coefficient $(C_r)$ to generate an output of $(Y_r - Y_i) C_r$.

The outputs from the first and the second FIR filters 32 and 34 are supplied to a second subtracter 42 while the outputs from the first and the third FIR filters 32 and 36 are provided to a third subtracter 46. The second subtractor 42 serves to subtract the output $(Y_r + Y_i) C_i$ of the second FIR filter 34 from the output $Y_r (C_r + C_i)$ of the first FIR filter 32 to produce the in-phase output $Z_r$, $Y_r (C_r + C_i) - (Y_r + Y_i) C_i$. The third subtractor 46 serves to subtract the output $(Y_r - Y_i) C_r$ of the third filter 36 from the output $Y_r (C_r + C_i)$ of the first FIR filter 32 to produce the quadrature output $Z_i$, $Y_r (C_r + C_i) - (Y_r - Y_i) C_r$.

Accordingly, only three FIR filters are needed to implement the complex filter apparatus, to thereby enable the reduction of the total number of multipliers to 3N multipliers although the number of adders is increased. However, since the hardware implementation of an adder is much easier and less expensive than that of a multiplier, it does not seriously affect the hardware implementation of the overall apparatus.

While the present invention has been shown and described with respect to the preferred embodiments, it will be apparent to those skilled in the art that many changes and modifications may be made without departing from the spirit and scope of the invention as defined in the appended claims.

What is claimed is:

1. A complex filter apparatus for use in an equalizer for correcting an input television signal to produce a filtered output television signal wherein the input television signal includes a complex valued input signal Y having an in-phase and a quadrature input components represented by a real part $Y_r$ and an imaginary part $Y_i$ and the filtered output television signal includes a complex valued output signal Z having an in-phase and a quadrature output components represented by a real part $Z_r$ and an imaginary part $Z_i$, which comprises:

an adder for adding the real part $Y_r$ and the imaginary part Yi to produce an output of $(Y_r + Y_i)$;

a first subtractor for subtracting the imaginary part $Y_i$ from the real part $Y_r$ to produce an output of $(Y_r - Y_i)$;

a first filter having a filter coefficient $(C_r + C_i)$ for multiplying the real part $Y_r$ by the filter coefficient $(C_r + C_i)$ to generate an output of $Y_r(C_r + C_i)$;

a second filter having a filter coefficient $C_i$ for multiplying the output from the first adder by the filter coefficient $C_i$ to generate an output of $(Y_r + Y_i)C_i$;

a third filter having a filter coefficient $C_r$ for multiplying the output from the first subtractor by the filter coefficient $C_r$ to generate an output of $(Y_r - Y_i)C_r$;

a second subtractor for subtracting the output of the second filter from the output of the first filter to produce an output $Y_r(C_r + C_i) - (Y_r + Y_i)C_i$ as the real part $Z_r$; and a third subtractor for subtracting the output of the third filter from the output of the first filter to produce an output $Y_r(C_r + C_i) - (Y_r - Y_i)C_r$ as the imaginary part $Z_i$.

2. The apparatus as recited in claim 1, wherein each of the first, the second and the third filters is a finite impulse response filter.

* * * * *